Patented Nov. 12, 1946

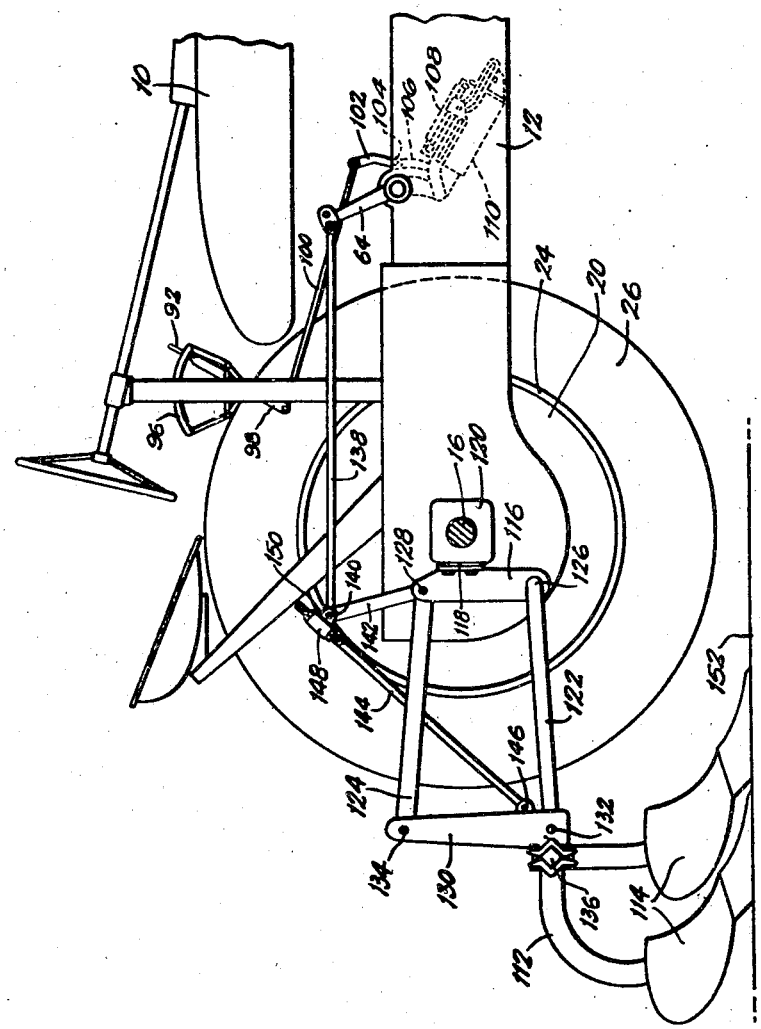

2,410,945

UNITED STATES PATENT OFFICE 2,410,945

TRACTOR JACK

Arnold E. W. Johnson, Oak Park, and John R. Orelind, Wilmette, Ill.

Original application March 8, 1943, Serial No. 478,462. Divided and this application October 25, 1943, Serial No. 507,550

1 Claim. (Cl. 97—50)

This invention relates to tractor jacks and is a division of our copending application having Serial No. 478,462, filed March 8, 1943.

An important object of this invention is to provide a tractor having an implement capable of dual operation: (1) that of earth working; and (2) as a jack in combination with minute finger-tip control therefor.

It is also an important object of this invention to provide a jack especially adapted for tractors or the like and which is actuated by power supplied from the tractor.

An important requirement of a tractor jack is that it be capable of lifting within accurate predetermined limits. It is necessary, therefore, as a requisite for efficient tractor jack operation to provide a power lift arm which is movable through vernier adjustment.

Other and further important objects of this invention will become apparent from the disclosures in the following specification and accompanying drawing.

The drawing shows a side elevation of a tractor incorporating the tractor implement jack with finger-tip control.

As shown in the drawing, reference numeral 10 indicates generally a tractor of the usual type having a chassis 12 upon which is mounted a forward wheel (not shown) and a pair of rear axles 16, one one being shown. The rear axles 16 are journaled within bearing members 120 and support large wheels 20, which ordinarily accompany agricultural tractors. A pneumatic tire 26 is mounted on a rim member 24.

Heretofore, mechanisms have been employed to actuate a power-lift arm 64, but most of these have been restricted to full movement of the arm between its extreme end positions, and generally no provision was made for intermediate stops of the arm. If intermediate stops of the power-lift arm were available, no accurate means were ever provided to stop the arm at some predetermined desired position. An application on "Power adjusting mechanism," Serial No. 466,463, sets forth an easily operated finger-tip lever which, upon being moved through its arcuate range, causes an equal arcuate movement of the power arm 64. Provision is made in that mechanism for providing positive locking means of the arm 64 at whatever point the finger-tip lever is stopped. A like finger-tip lever 92 is pivoted to an upright on the chassis and is capable of moving across the arcuate scale 96, which is accurately calibrated and positioned in close proximity to the operator of the tractor so that he may easily make any desired movement of this finger-tip control lever 92. An extension 98 of the lever 92 beneath the pivot point engages a link arm 100, which in turn pivotally engages an arm 102 and pivots it about a point 104 so that a lower end 106 of the arm 102 controls a valve actuating means including a member 108 associated with an hydraulically operated device including a cylinder member 110. The member 108 is so adjusted that a movement of the finger-tip lever 92 causes an opening or closing thereof and permits greater or less movement of the piston (not shown) within the hydraulic cylinder 110. Movement of the piston causes a direct movement of the arm 64. Provision is also made within this hydraulic mechanism to positively lock the piston in its ultimately assumed position, as determined by operation of the member 108 by the finger-tip lever 92.

The combining of the finger-tip control with the tractor jack, as disclosed herein, is novel inasmuch as it produces a long sought-after device capable of much greater precision as required for tractor jacks in order that they be used successfully. It is now possible to accurately raise one wheel of the tractor to any predetermined height. Such a condition is very desirable inasmuch as the tractor wheels are so very heavy it is necessary, when mounting or dismounting them, to have the axle at the exact height for sliding of the wheel on or off without the necessity of lifting it. The calibrated finger-tip control enables the operator to adjust the axle at just this proper height. Certainly the devices that were limited only to full arcuate movement of the power-lift arm were not adapted to the operation of tractor jacks, nor were the devices that were capable of intermediate stopping of the power arm to be successfully utilized with a tractor jack, for the reason that the axle height could not be adjusted to any predetermined height without much running back and forth in attempting to get the power arm in the right position. It is to be understood, of course, that specific details of the type of power-operated mechanism are not disclosed, because they are not an integral part of this invention, but rather any device that permits accurate finger-tip control of the power-lift arm will suffice. For details of such a device, see the above mentioned application having Serial No. 466,463.

The drawing shows a cultivating implement 112 having earth-working tools 114, which are adapted to penetrate relatively soft ground and so prepare it for proper crop raising. The implement 112 is directly mounted on the tractor 10 somewhat similarly to the mounting of the jack standard, as shown in Figure 1. A bracket 116 is attached at 118 to an axle housing 120, shown as a square in cross section in contradistinction to the circular housing 18 shown on the tractor in Figure 1 of the parent application. A pair of lever arms 122 and 124 are pivoted respectively to the lower and upper portions of the bracket 116 at 126 and 128. The other ends of the arms 122 and 124 are pivoted to a bracket 130 at the points 132 and 134, respectively. The cultivator 112 is bolted or otherwise attached to the shaft 136, which forms a unitary part of the vertical bracket 130. A link arm 138, connected to the arm 64 at one end, pivots about a point 140, which point forms an arc described by a connecting link or radius rod 142 as pivotable about its lower end at the point 128 on the bracket 116. A link arm 144 interconnects the bracket 130 by connection at a point 146 with the arms 138 and 142 at their pivot point 140. A sleeve 148 is slidably adjustable along the length of the link arm 144 and has an integral bracket 150, which is adapted to receive a pin through an aperture therein at the point 140 to thereby join the three members 138, 142, and 144. The depth that the cultivator is capable of attaining is controlled by adjusting the sleeve 148 either higher or lower on the link arm 144.

As shown in the drawing, the ground level is at 152, and the tractor wheel 20 is raised therefrom. This condition has arisen, because the ground 152 is so hard that the cultivator tools 114 cannot penetrate and, inasmuch as there is a direct linkage connection between the power-lift arm 64 and the tools 114, the tractor itself then raises. Hence, this cultivator implement acts in place of a jack when used on ground hard enough to prevent penetration of the cultivator tools. Generally, ordinary earth is not packed solidly enough to resist penetration of implement tools, so the tractor is run onto some hard flooring, such as concrete or the like, and the finger-tip lever 92 moved along its arcuate scale to any desired point, and the rear wheels of the tractor are thereby raised or lowered, as required. It will be seen that the implement performs all the functions of a jack.

Heretofore, resilient means have been employed intermediate the direct linkage connection between the power-lift arm 64 and the implement tools 114, so that, upon actuation of the arm 64 when the tractor is raised on some firm support, the linkage could be reduced in length to prevent injury of the tools. In the construction illustrated in the drawing, such resilient or yieldable member has been entirely removed so that the tools do not "give," and the result will be a lifting of the rear end of the tractor.

We have developed a practically operable tractor jack capable of commercial adaptation for the sole reason that it is provided in combination with the finger-tip control, permitting operation thereof in minute increments, and we do not intend limiting the patent granted thereon otherwise than as necessitated by the appended claim.

What is claimed is:

In a tractor having an elongated body and a transverse axle at the rear thereof for carrying rear traction wheels, a housing for said transverse axle, said tractor containing a power source including a swingable work arm positioned on one side of the tractor at a forward point on the elongated body, a hydraulic device adapted to cause swinging movement of said work arm, a control lever, actuating means associated with said hydraulic device, linkage between said control lever and said actuating means, the tractor having a jack means at the rear of the tractor operated by said work arm, the said jack means comprising a cultivating implement, longitudinally extending and vertically joined parallel links connecting said cultivating implement to said axle housing, a radius rod pivotally attached to the upper parallel link at its point of connection to the axle housing and extending upwardly, said radius rod and said work arm substantially parallel one to the other and joined by a rigid connecting link, and another rigid link joining said radius rod and the other of said parallel links at the rear end thereof, whereby movement of the control lever to swing the work arm rearwardly will cause a downward swinging of said parallel links and an upward movement of the rear of said tractor.

ARNOLD E. W. JOHNSON.
JOHN R. ORELIND.